US011500949B2

(12) United States Patent
Jadav et al.

(10) Patent No.: US 11,500,949 B2
(45) Date of Patent: Nov. 15, 2022

(54) MATCHING USERS BY LEVERAGING INDOOR PROXIMITY AND AVAILABILITY

(71) Applicant: INTERNATIONAL BUSINESS MACHINES CORPORATION, Armonk, NY (US)

(72) Inventors: Divyesh Jadav, San Jose, CA (US); Raphael I. Arar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/665,351

(22) Filed: Oct. 28, 2019

(65) Prior Publication Data

US 2021/0124787 A1    Apr. 29, 2021

(51) Int. Cl.
*G06F 16/00* (2019.01)
*G06F 16/9535* (2019.01)
*G06F 16/9537* (2019.01)
*G06F 16/9538* (2019.01)
*G06F 16/9536* (2019.01)
*G06F 40/205* (2020.01)

(52) U.S. Cl.
CPC ...... *G06F 16/9535* (2019.01); *G06F 16/9536* (2019.01); *G06F 16/9537* (2019.01); *G06F 16/9538* (2019.01); *G06F 40/205* (2020.01)

(58) Field of Classification Search
CPC ............. G06F 16/9535; G06F 16/9537; G06F 16/9536; G06F 16/9538; G06F 40/205
See application file for complete search history.

(56) References Cited

U.S. PATENT DOCUMENTS

| 6,454,705 | B1* | 9/2002 | Cosentino | G16H 40/67 600/592 |
|---|---|---|---|---|
| 8,060,451 | B2 | 11/2011 | Degeratu | |
| 9,767,436 | B2 | 9/2017 | Chenoweth | |
| 2010/0120011 | A1 | 5/2010 | O'Brien | |
| 2014/0171129 | A1* | 6/2014 | Benzatti | H04L 67/18 455/457 |
| 2015/0356250 | A1* | 12/2015 | Polimeni | G16H 10/60 705/3 |
| 2016/0055443 | A1 | 2/2016 | Chee | |
| 2017/0109683 | A1 | 4/2017 | Carbonell | |
| 2018/0165062 | A1* | 6/2018 | Yoo | G16H 40/20 |

(Continued)

OTHER PUBLICATIONS

Edelman, "Freelancing in America Study", Daniel J. Edelman, Inc., Sep. 2014 [accessed on Oct. 22, 2019], 38 pages, Retrieved from the Internet: <URL: https://www.freelancersunion.org/53Million>.

(Continued)

*Primary Examiner* — Hung Q Pham
(74) *Attorney, Agent, or Firm* — Elliot J. Shine

(57) ABSTRACT

A method, computer system, and a computer program product for matching one or more users is provided. The present invention may include collecting a user's information. The present invention may include determining that there is an overlap between the user's information and information contained within a knowledge base. The present invention may include ranking one or more matches of the user. The present invention may include displaying the ranked one or more matches to the user. The present invention may include collecting feedback from the user.

17 Claims, 6 Drawing Sheets

(56) References Cited

U.S. PATENT DOCUMENTS

2018/0218468 A1 8/2018 Dunne
2018/0300818 A1 10/2018 Kabdebon

OTHER PUBLICATIONS

Gheorghe, "State of Freelancing in IT and Future Trends", World Academy of Science, Engineering and Technology, International Journal of Economics and Management Engineering, 2015 [accessed on Oct. 25, 2019], vol. 9, No. 5, pp. 1474-1478, ISNI: 0000000091950263, Retrieved from the Internet: <URL: https://pdfs.semanticscholar.org/be30/c6e158da32a2fcb615ae317093aca6394ab5.pdf>.

Mell et al., "The NIST Definition of Cloud Computing", National Institute of Standards and Technology, Special Publication 800-145, Sep. 2011, 7 pages.

* cited by examiner

MATCHING USERS BY LEVERAGING INDOOR PROXIMITY AND AVAILABILITY

BACKGROUND

The present invention relates generally to the field of computing, and more particularly to cognitive mobile solutions.

Physical connectivity, by way of air, road, and rail travel, has improved significantly over the last two centuries. The advent of telephones, the Internet, and mobile phones may have advanced connection and communication throughout the world. However, while using technology to communicate and interact with people from around the globe may be beneficial, human connections may also be necessary in maintaining both personal and working relationships.

Despite the growth in connectivity, it may be important to maintain meaningful and close connections with others. There may also be a need to find people with similar interests, and whose experience and advice may be beneficial, both quickly and nearby.

SUMMARY

Embodiments of the present invention disclose a method, computer system, and a computer program product for matching one or more interested users. The present invention may include collecting a user's information. The present invention may include determining that there is an overlap between the user's information and information contained within a knowledge base. The present invention may include ranking one or more matches of the user. The present invention may include displaying the ranked one or more matches to the user. The present invention may include collecting feedback from the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
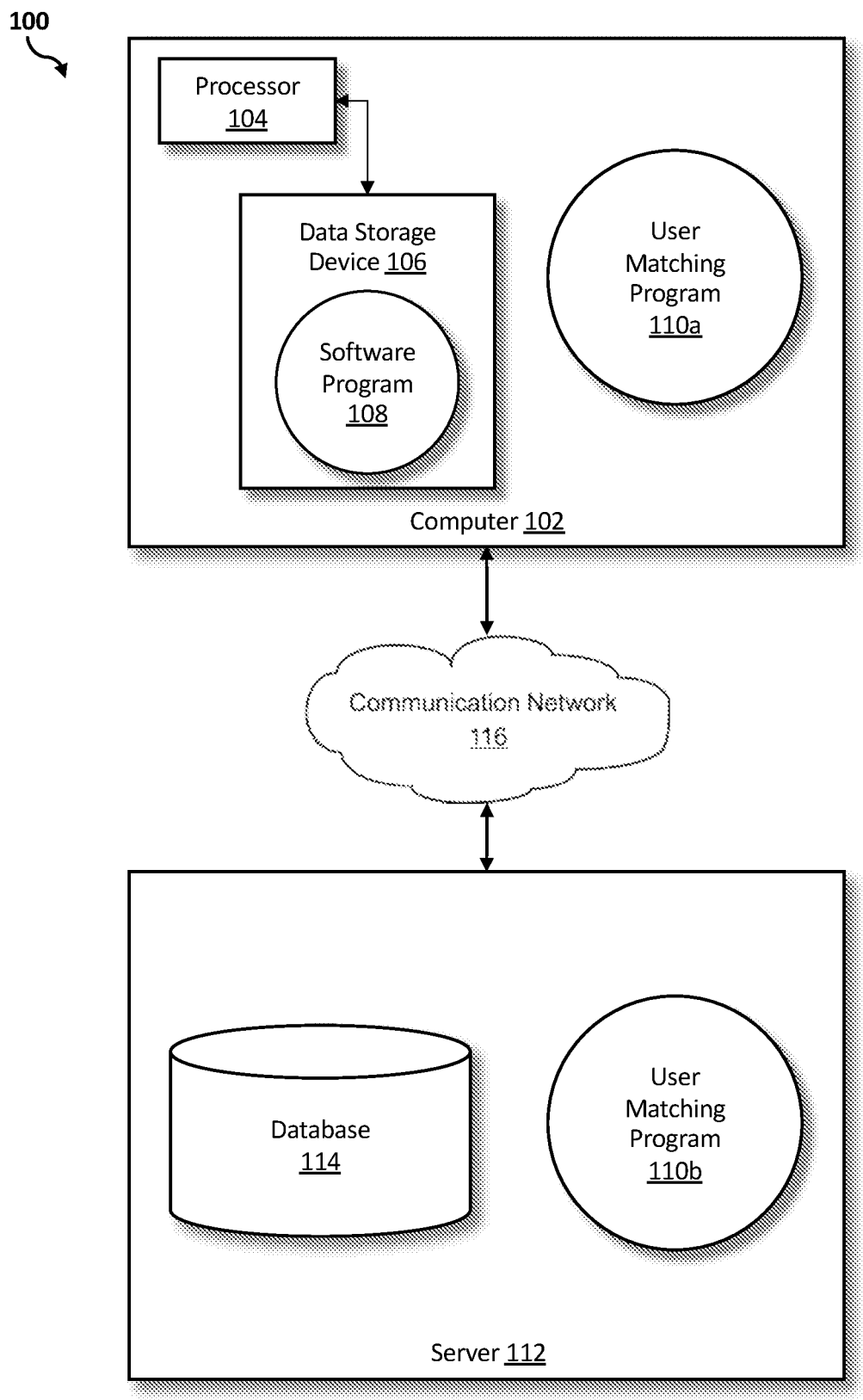
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for matching interested users by leveraging indoor proximity and availability. An interested user may include a user having a mentee-mentor relationship, a consumer-producer relationship, a collaborator-type relationship, and/or a shared interest with another user. As such, the present embodiment has the capacity to improve the technical field of collaboration services by collecting profile information and/or ad hoc input, determining any overlapping interests, areas, and/or ad hoc input, ranking possible matches based on a user's distance and availability, matching interested users together, and collecting active feedback. More specifically, the present invention may include collecting profile information, location data, and feedback from previous matches. The present invention may include determining whether the user has any ad hoc input. The present invention may include collecting and prioritizing ad hoc input (if any). The present invention may include matching users by determining any overlapping interests, areas, and/or ad hoc input. The present invention may include ranking possible matches based on distance, availability, feedback, and/or user preference. The present invention may include displaying the ranked matches to the user. The present invention may include collecting active feedback from matches.

As described previously, physical connectivity, by way of air, road, and rail travel, has improved significantly over the last two centuries. The advent of telephones, the Internet, and mobile phones may have advanced connection and communication throughout the world. However, while using technology to communicate and interact with people from around the globe may be beneficial, human connections may also be necessary in maintaining both personal and working relationships. Despite the growth in connectivity, it may be important to maintain meaningful and close connections with others. There may also be a need to find people with similar interests, and whose experience and advice may be beneficial, both quickly and nearby.

As a result, users may want to locate one or more other users that are within a defined geographic location (e.g., that are physically nearby) as a local connection may be preferable to a remote connection. Therefore, it may be advantageous to, among other things, collect user profile data, including location and availability, determine overlapping interests and areas, rank possible matches based on distance and availability, and connect matches to one another.

According to at least one embodiment, the present invention may collect information from a user profile. The information in the user profile may include professional interests, areas of research, job details, location, and feedback from previous matches which have been made using the invention. The user profile may contain intent and/or wish list information, as well as static information about a primary work location of the user and any skills of the user, among other things. The user profile may be constructed automatically from an existing enterprise directory that may contain job information and location information. The user may also supply information (e.g. interests and research areas) for the user profile. The user profile may grow over time based on the input of additional information. The user may, for example, select one or more interests from a predefined list of interests, and may also have the option of adding additional interests. New interests added by the user may go through a vetting process within the invention, whereby, for example, a newly added interest may be added to the list of predefined interests after twenty users have chosen to add the interest. The user profile may also grow over time through cognitive learning which may be based on introspection of emails, chats, acceptance of recommendations by the invention, research papers and/or blogs published by the user, job titles and/or roles of group, and/or management chain of the user.

The user profile may be publicly viewable to the enterprise within which it is hosted. Any member of the enterprise which hosts the user profile, whether matched to the particular user or not, may be able to view the user profile information.

According to at least one embodiment, the present invention may have access to location data of the user. Location data of the user may include a real time physical position, a known office location, and/or a travel or meeting location. The invention may utilize an existing proximity sensing network that can localize the real time physical position of a user inside a building. IoT sensors (e.g. BLE beacons, Wi-Fi tracking, and/or smartphones) may be used to identify the real time physical location of a user. The invention may have access to an enterprise directory which may include an office location (e.g. site, building, floor, and/or room number, among other things). The invention may also have access to the user's calendar schedule from which the invention may automatically mine location data relating to travel and/or meetings.

According to at least one embodiment, the present invention may permit the user to input a user availability. A user availability may include specific times that the user is available. The invention may also have access to the user's calendar schedule from which the invention may automatically mine calendar availability. The invention may also have access to enterprise services and applications, including a calendar on the user's mobile device, and any other scheduling applications, from which the invention may mine information.

According to at least one embodiment, the present invention may permit the user to input explicit ad hoc input. The explicit ad hoc input may be a specific request or question that may require a response from another user.

According to at least one embodiment, the present invention may determine overlapping areas and interests of the user and of other users of the invention. If ad hoc input was supplied by the user, then the invention may prioritize determining overlapping areas relevant to the topic(s) of the ad hoc input. For example, ad hoc input may include areas of interest listed in a user's profile or may tangentially relate to an interest on the predefined list of interests. Any tangentially related ad hoc input may be handled by determining a reasonably close interest on the predefined list of interests, and if none is found, then by adding a new interest to the predefined list of interests.

According to at least one embodiment, the present invention may narrow down the pool of possible matches to only other users who have overlap in the areas, interests, and/or topic(s) of the ad hoc input. The present invention may also assign a higher rank to matches that have more overlap than to matches that have less overlap. If ad hoc input is provided by a user, then the invention may only look for overlap in the topic(s) of the ad hoc input.

According to at least one embodiment, the present invention may rank the narrowed down pool of possible matches according to distance, availability, feedback, and/or user preference. The invention may calculate a distance between two users using a distance calculator. The distance calculator may use the location information of the two users. Distance between two users may be coarse grained (e.g. in terms of city/town) and also fine grained (e.g. within a building). Availability of users may be found by the invention through explicit means (e.g. user availability may be inputted into the invention by the user, and may include available days and times) and through implicit means (e.g. user availability may be mined from a calendar schedule). Feedback from the user (i.e., user feedback) regarding previous matches may be taken into consideration when providing feedback. Feedback may include a rating of how successful each of the users felt their match was, and may be stored in a knowledge base, as will be discussed in more detail below, and may be stored in a cache in the user profile when needed.

User preference(s) may be configured by a user of the invention, and may include one or more rankings of interests, etc. For example, the user may decide to rank a particular category (e.g. distance, availability) higher than other categories.

According to at least one embodiment, the present invention may display the ranked possible matches to the user. The invention may display matches in order of ranking according to a determined algorithm, which may be based on the rankings defined by the user of the invention.

According to at least one embodiment, the present invention may allow the user to contact other users of the invention that the user may have matched with. Either member of a matched pair (e.g., a mentor and/or a mentee) may contact the other after a match result is presented.

According to at least one embodiment, the present invention may collect active feedback from both users in a match. Both users may be prompted to give feedback on how successful the match may have been. This feedback may be collected and used to improve the algorithm for future matches and may be used to build a pool of ranked mentors. For example, feedback may be used to rank mentors and assign a rating to each of the ranked mentors. Any rating and/or rank, however, of a user (e.g., a mentor) may not be the only criterion used by the invention in suggesting a match (e.g., suggesting a mentor to a mentee). Other factors, including but not limited to proximity, availability, and load balancing may be taken into consideration when suggesting a match as well.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a user matching program 110*a*. The networked computer environment 100 may also include a server 112 that is enabled to run a user matching program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the user matching program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the user matching program 110a, 110b (respectively) to match users by leveraging indoor proximity and availability, among other things. The user matching method is explained in more detail below with respect to FIGS. 2A and 2B.

Figure 2A:
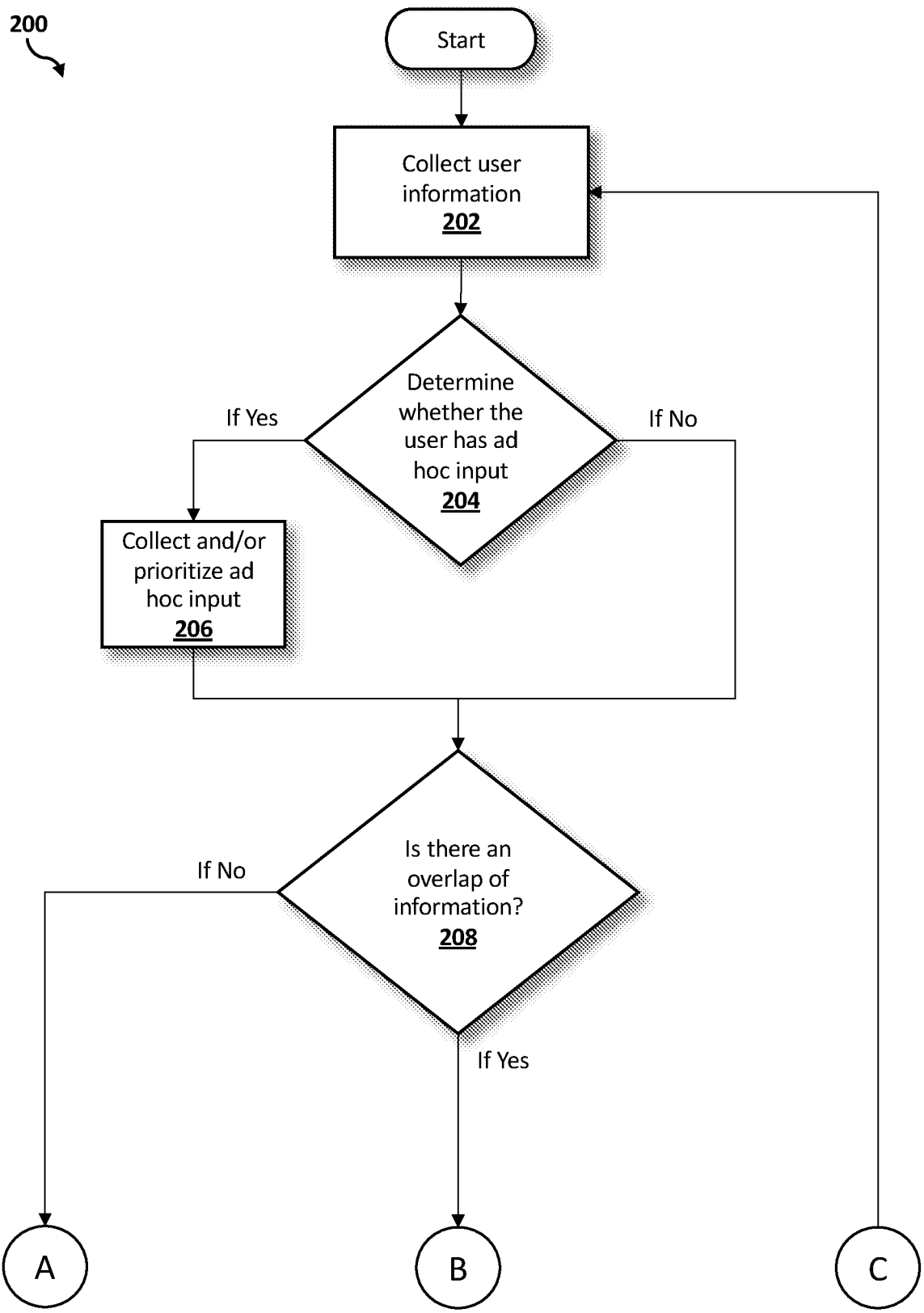
FIGS. 2A and 2B are an operational flowchart illustrating a process for matching one or more users according to at least one embodiment.
Figure 2B:
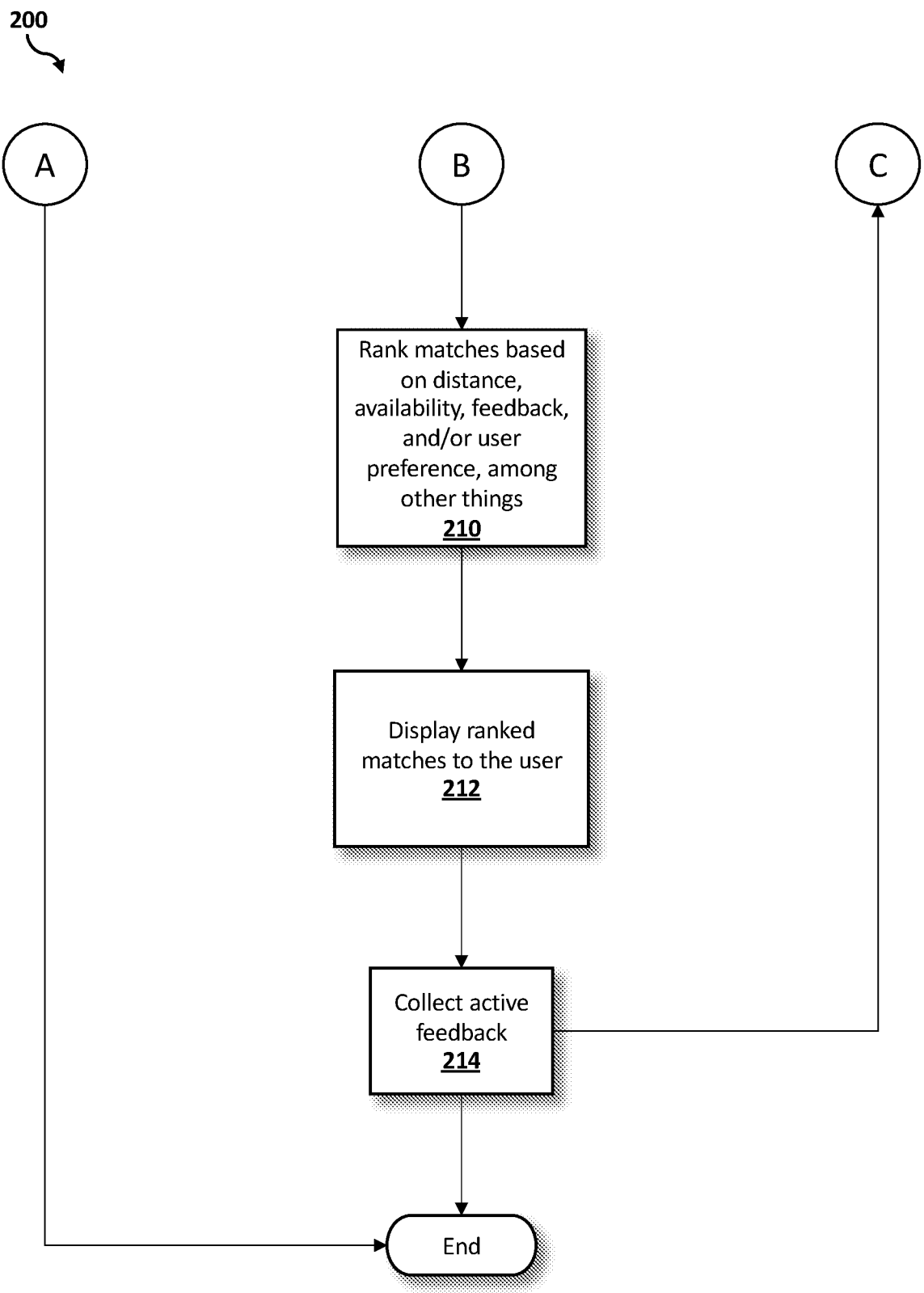

Referring now to FIG. 2A and FIG. 2B, an operational flowchart illustrating the exemplary user matching process 200 used by the user matching program 110a and 110b according to at least one embodiment is depicted.

At 202, information from the user profile, including but not limited to location data and feedback information (i.e., feedback) are collected. The information in the user profile may include professional interests, areas of research, job details, location, availability and feedback from previous matches using the user matching program 110a, 110b.

The user profile may be constructed automatically from an existing enterprise directory that may contain job information and location information. The user may also supply information (e.g. interests and research areas) for the user profile. The user profile may grow over time based on the addition of user input. The user profile may also grow over time through cognitive learning which may be based on introspection of emails, chats, acceptance of recommendations by the user matching program 110a, 110b, research papers and/or blogs published by the user, job titles and/or roles of group, and/or management chain of the user.

Location data of the user may include real time physical position, a known office location, and/or travel and meeting locations. Dynamic indoor location matching (e.g., matching based on a location of a mentee and a potential mentor) may be taken into consideration. An existing proximity sensing network that can localize the real time physical position of a user inside a building may be used. IoT sensors which may include BLE beacons, Wi-Fi tracking, and/or smart phones may be used to localize the real time physical location of a user. An enterprise directory which may include office location (e.g. site, building, floor, and room number) may be used. Further, the user's calendar schedule may provide location data relating to travel and/or meetings.

The feedback information may come from previous experiences using the user matching program 110a, 110b. For example, after two users may be matched, both users may be prompted to submit feedback about the success of the match. This feedback may then be stored to provide more accurate matches in the future. For example, John and Fred may have been matched using the user matching program 110a, 110b. Both John and Fred may give feedback about how they felt the match went.

At 204, it is determined that the user has added ad hoc input. The user may wish to input an explicit request and/or question which may require a response in the form of ad hoc input. The user may also wish to find another user specifically targeted at responding to the user's ad hoc input, instead of garnering a match by the user matching program 110a, 110b, which takes into consideration all information within the user profile. In this case, the user may prioritize the ad hoc input and may indicate that the ad hoc input should be considered before any other information and/or factors, and/or that the user input should be the sole factor for consideration in generating a match. The user's ad hoc input (e.g., a specific request and/or question requiring input from another user) is collected at 206, as will be described in more detail below.

At 206, any ad hoc input from the user is collected and prioritized. The user may have an explicit request or question that requires a response in the form of ad hoc input. For example, a user may have a specific career question they may want to be answered by another user in the same field. The ad hoc input may be prioritized over the other user information, including the user information described previously with respect to step 202 above, so that the user matching program 110a, 110b may only focus on the ad hoc input. For example, a user may provide ad hoc input that is not closely related to the user's areas of interests and research, so the user matching program 110a, 110b may focus on finding matches in the same field as the ad hoc input.

If the user does not have ad hoc input (e.g., no specific request and/or question(s) requiring input from another user were inputted by the user), then the user matching program 110a, 110b does not collect and/or prioritize ad hoc input and continues to step 208, as described in more detail below.

At 208, the user matching program 110a, 110b determines whether there is an overlap of interests, areas of research and/or ad hoc input information (if any) between the user and information contained within the knowledge base (e.g., including possible matches). Using natural language processing (NLP) techniques, such as those implemented in Watson™ (Watson and all Watson-based trademarks are trademarks or registered trademarks of International Business Machines Corporation in the United States, and/or other countries) application program interfaces (APIs), to parse through the user's information and the information contained within the knowledge base, the user matching program 110a, 110b may sort the interests, areas of research and/or ad hoc input information into categories. If a predefined category does not exist for a parsed interest, area of research and/or piece ad hoc input information, then the user matching program 110a, 110b may use a lexical database (e.g., WordNet®) to find a closest match between the parsed interest, area of research and/or piece ad hoc input information and the predefined categories.

The knowledge base may maintain a taxonomy (e.g., a classification scheme) of areas in which mentoring is available. The maintained taxonomy may be based on past mentoring sessions across all users of the user matching program 110a, 110b.

The knowledge base may learn from prior sessions with respect to effectiveness. All user information, data relating to past matches, and feedback provided by users may be included in the knowledge base. The knowledge base may also include static, system-wide information, for example, site-specific maps, mentoring taxonomies and expertise that the system has mentees for. Feedback relating to a given mentor and/or mentee may be located in the knowledge base, while location and availability may be primarily stored locally in the user's device, or may be part of the user profile, with lightweight replication to the knowledge base for dissemination.

If the user matching program 110a, 110b determines that there is overlap at 208, then at 210, the user matching program 110a, 110b ranks possible matches based on distance, availability, feedback, and/or user preference, among other things. If, however, the user matching program 110a, 110b determined that there was no overlap at 208, then the process ends.

As described previously, at 210, the user matching program 110a, 110b ranks possible matches based on distance, availability, feedback, and/or user preference, among other things. The ranking (e.g., assignment of a position of hierarchy) of possible matches may be done dynamically (e.g., by using a ranking function defined by an administrator or user of the user matching program 110a, 110b). The dynamic ranking may be done based on a system-wide ranking function selected by the system administrator and/or by a personalized ranking function selected by a user of the user matching program 110a, 110b. The ranking function may prioritize distances and/or availability of users, or a previous mentor ranking, among other things.

The user matching program 110a, 110b may recommend (e.g., rank more highly) a match who may be physically closest to the user (e.g., if the user matching program 110a, 110b is prioritizing distance). Distance may be calculated using a distance calculator, and distance between two users may be coarse grained (e.g. in terms of city, town, site) and/or fine grained (e.g. within a particular building and/or residential or commercial site). To calculate a distance, location data of two users may be needed. Location data of a user may be found in the user profile and may include a real time physical position, known office location, and any travel and/or meeting locations. Location data may be based on calendar and/or global positioning system (GPS) information of a connected smartphone and/or tablet of the user (e.g., the user's smartphone and/or tablet may be connected to the user's profile and the user matching program 110a, 110b may obtain tracking information by accessing the user profile).

An existing proximity sensing network that can localize a real time physical position of a user inside a building may also be used. IoT sensors which may include Bluetooth® (Bluetooth and all Bluetooth-based trademarks and logos are trademarks or registered trademarks of Bluetooth SIG, Inc. and/or its affiliates) Low Energy (BLE) beacons, Wi-Fi tracking, and/or smartphones (discussed above) may be used to localize the real time physical location of a user. An enterprise directory which may include an office location (e.g. a site, a building, a floor, and/or a room number, among other things) may be used. A user's calendar schedule may also provide location data relating to the user's travel and/or meetings.

The user matching program 110a, 110b may rank matches in order of real time availability of the user, which may be found in the user profile. Availability of users may be dynamically discoverable by the user matching program 110a, 110b (e.g., by mining a connected user calendar) and/or by the user explicitly inputting information about available times into the user profile. For example, the user matching program 110a, 110b may perform indoor location matching by mining travel plans of a mentor and/or mentee based on introspecting calendar date, and/or by introspecting a mentor and/or mentee's status on one or more enterprise messaging tools (e.g. Slack® (Slack is a registered trademark of Slack Technologies, Inc. in the United States and/or other countries)).

Feedback information (i.e., feedback) may be used in the ranking process, and may be obtained from the knowledge base and/or user profile. Feedback information may include feedback from previous matches with other users. For example, at the end of a match, both users may submit feedback rating several dimensions of a match (e.g., the dimensions may include the accuracy of the match, the attentiveness of the other user with whom the user was matched, and the knowledge and/or expertise of the other user with whom the user was matched, among other things). Feedback may be provided by a user in the form of a survey located within the user matching program 110a, 110b. Positive feedback about a user (e.g., relating to the effectiveness of the user as a mentor for a given mentee) may increase the user's rating for a given match. Multiple instances of positive feedback (e.g., a mentor receiving positive feedback from multiple mentees) may result in a system-wide rating improvement for the rated user (e.g., the mentor).

A user preference (e.g., relating to a prioritization of user values) may be set by the user and may be used to rank a particular category higher than other categories. For example, John may want to meet with a mentor in person. In this case, John may decide that a mentor who is located within the same building (e.g., within close proximity to John) is most important. The user matching program 110a, 110b may accordingly prioritize distance of other users when ranking the possible matches for John. Likewise, if a user prioritized immediate availability over location, then the user matching program 110a, 110b may rank possible matches based on this user preference.

At 212, resulting matches are displayed to the user. As described previously, the user matching program 110a, 110b may order matches according to a defined preference of the user, including, but not limited to, location, distance, and/or current availability of possible matches. User matches may populate within an interface for the user matching program 110a, 110b. The user may be select a displayed match to begin interacting with the match within the user matching program 110a, 110b interface.

For example, Bob may be visiting his company's headquarters for project A. While Bob is at the company's headquarters, Bob may open the user matching program 110a, 110b to check whether there are any other employees with similar interests and/or areas of expertise located within the same building (e.g., Bob prioritizes distance of other users in finding a match). Bob discovers that Susie, who works with him on project B, is currently located in an office in the same building and has periods of availability on the days that Bob will be there. Based on the analysis described previously with respect to steps 202 through 208 above, the user matching program 110a, 110b determines that Bob and Susie have overlapping interests. The user matching program 110a, 110b accordingly matches Bob and Susie together so that they may be able to meet in person and compare notes during their free time. The user matching program 110a, 110b displays the match to Bob in the user matching program 110a, 110b interface, along with information gathered from Susie's user profile and connected enterprise information, including Susie's company photo, mobile phone number, and current room location.

At 214, active feedback of matches is recorded. Active feedback may be used to improve future matches of the user and/or to build a pool of ranked mentors (e.g., to create a feedback loop which may be used to improve an algorithm of the user matching program 110a, 110b). Both the user and the match may be prompted (e.g., in a user interface) to provide feedback on the success of a match, which may be stored in the knowledge base and/or locally within a user's profile. Feedback may also be provided on one or more dimensions of a user match, which dimensions may be predefined within the user matching program 110a, 110b, or may be inputted by a user of the user matching program 110a, 110b. Feedback provided by the user may become part of the knowledge base, and may be included in the collected user information in future uses of the user matching program 110a, 110b.

It may be appreciated that FIGS. 2A and 2B provide only an illustration of one embodiment and do not imply any limitations with regard to how different embodiments may be implemented. Many modifications to the depicted embodiment(s) may be made based on design and implementation requirements.

Figure 3:
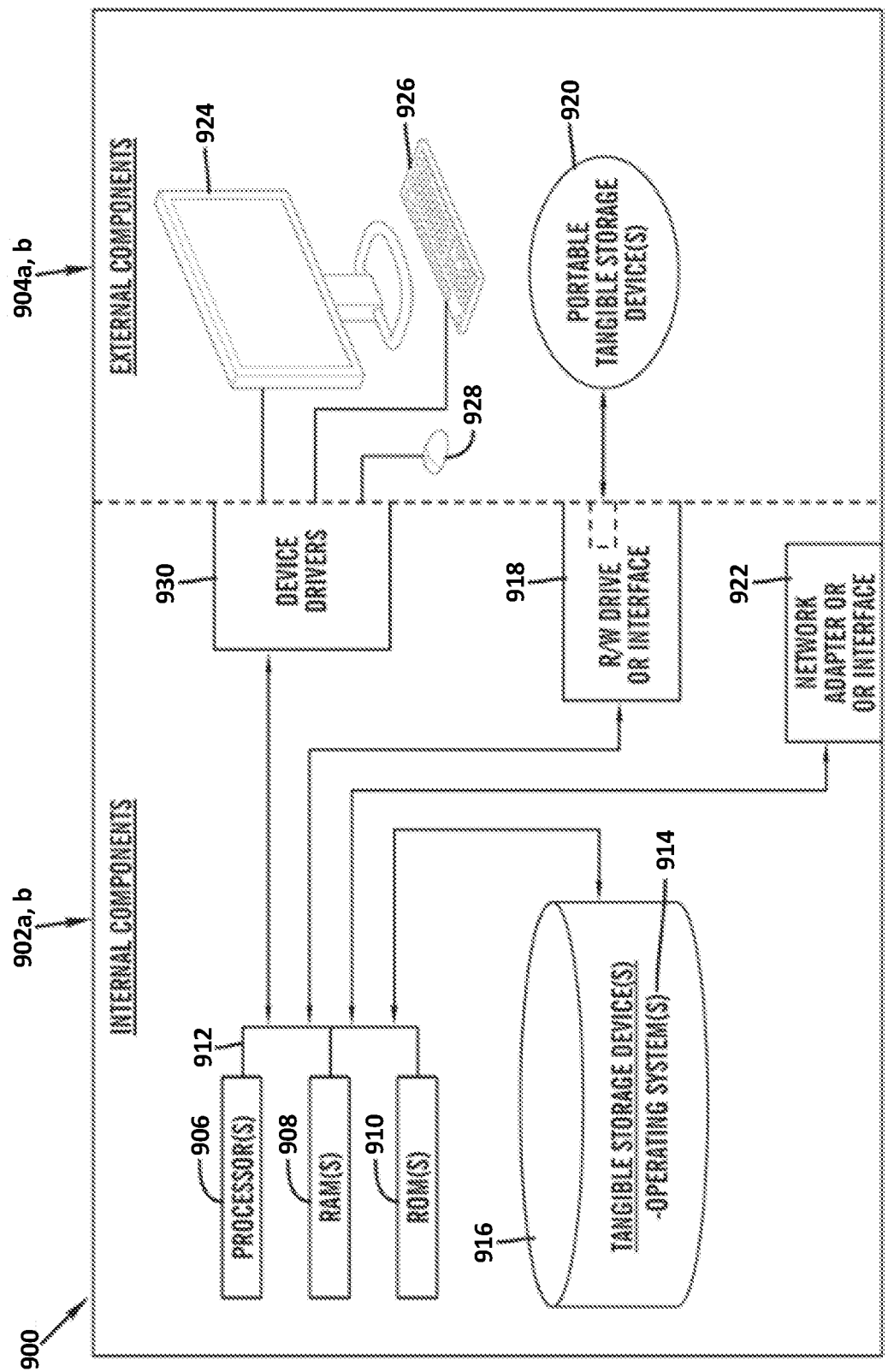
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the user matching program 110a in client computer 102, and the user matching program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the user matching program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the user matching program 110a in client computer 102 and the user matching program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the user matching program 110a in client computer 102 and the user matching program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
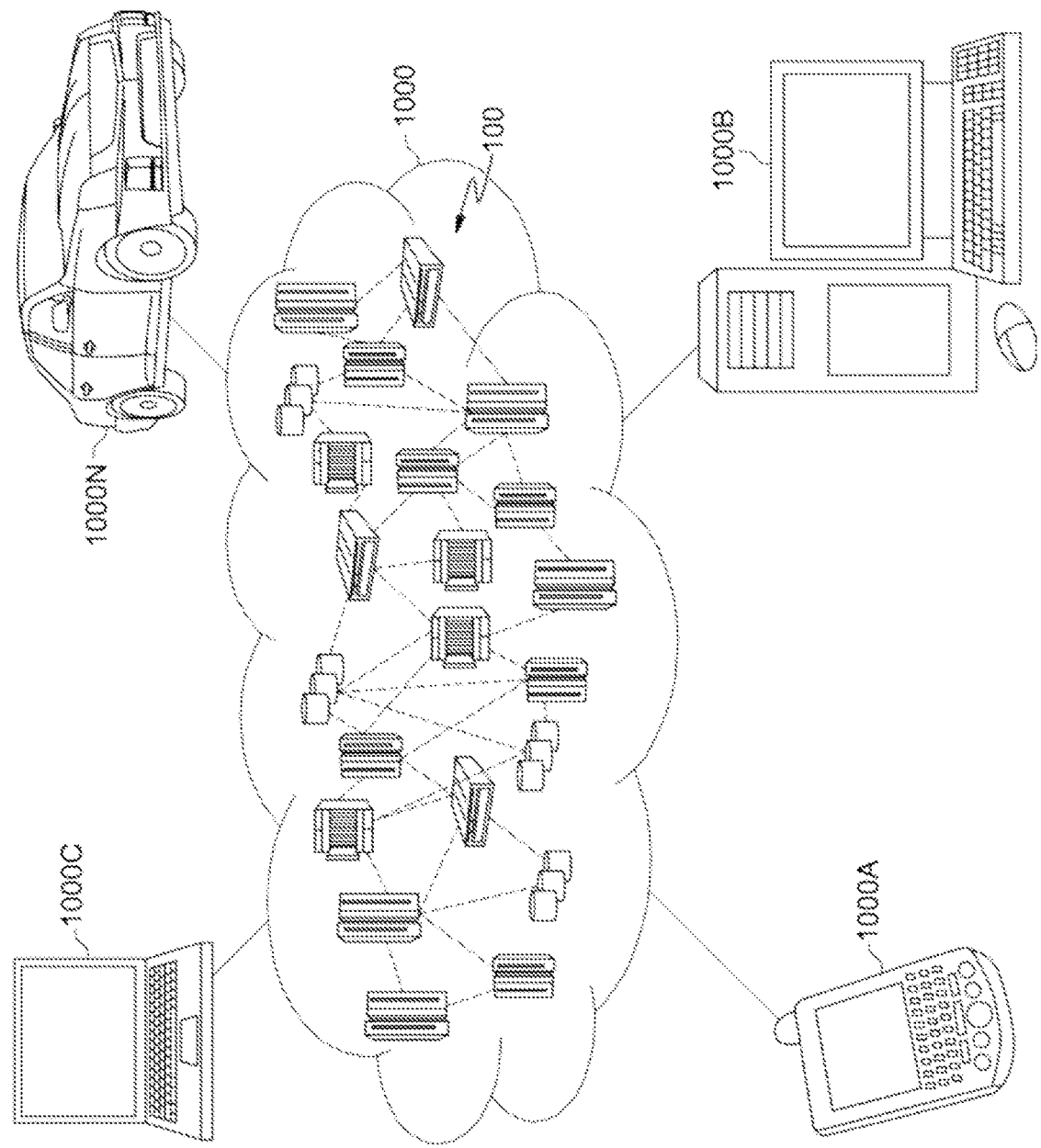
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
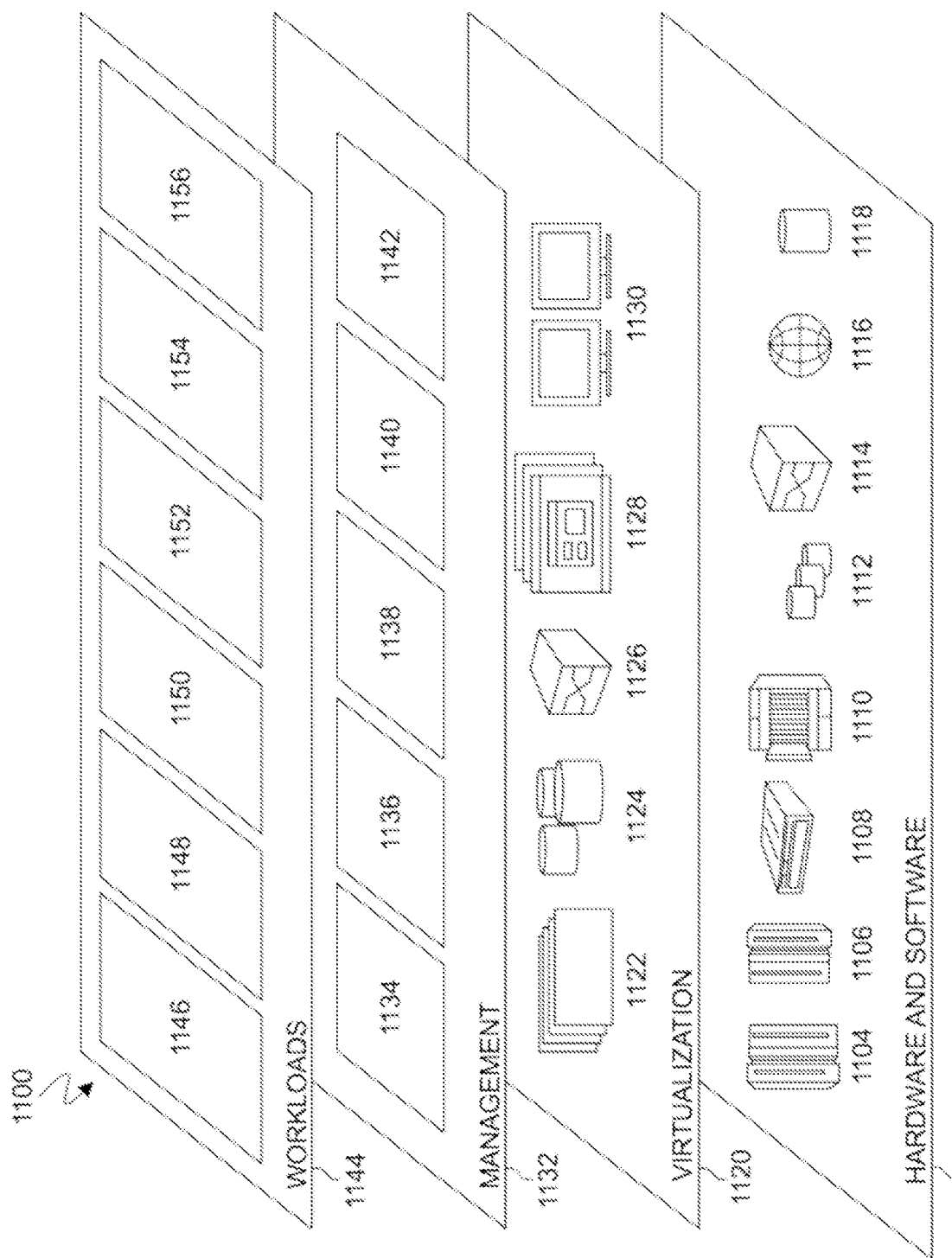
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and user matching 1156. A user matching program 110a, 110b provides a way to match users by leveraging indoor proximity and availability, among other things.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for matching one or more users, the method comprising:
   collecting information of a user;
   determining that there is an overlap between the user's information and information contained within a knowledge base;
   ranking one or more matches of the user by analyzing a distance between locations of the one or more matches and the user, mining an availability based on one or more scheduling applications, evaluating user feedback from previous matches and/or predefined user preferences, wherein a position of hierarchy within the ranking is dynamically assigned based on a ranking function which prioritizes the distance and the availability of the user and the one or more matches, wherein the distance is specified as a fine grained distance and is determined using an enterprise directory and at least one enterprise messaging tool to localize, in real time, a physical position of the user;
   displaying the ranked one or more matches and information corresponding to the one or more matches to the user, including mined data from the enterprise directory, wherein the mined data includes a company photo, a mobile phone number, and a current room location; and
   collecting feedback from the user utilizing one or more prompts displayed in a user interface, wherein each of the one or more prompts corresponds to one of a plurality of dimensions.

2. The method of claim 1, wherein collecting the user's information further comprises:
   determining that the user has ad hoc input; and
   collecting and prioritizing the user's ad hoc input.

3. The method of claim 2, wherein the user's ad hoc input is a question that requires a response from another user.

4. The method of claim 1, wherein determining that there is the overlap between the user's information and information contained within the knowledge base further comprises:
   parsing the user's information and information contained within the knowledge base using a natural language processing (NLP) technique; and
   sorting the user's parsed information and the parsed information from the knowledge base into one or more categories.

5. The method of claim 1, wherein displaying the ranked one or more matches to the user further comprises:
   populating the ranked one or more matches in an interactable user interface.

6. The method of claim 1, wherein collecting feedback from the user further comprises:
   prompting the user, in a user interface, to provide feedback relating to a success of a match.

7. A computer system for matching one or more users, comprising:
   one or more processors, one or more computer-readable memories, one or more computer-readable tangible storage medium, and program instructions stored on at least one of the one or more tangible storage medium for execution by at least one of the one or more processors via at least one of the one or more computer-readable memories, wherein the computer system is capable of performing a method comprising:
   collecting information of a user;
   determining that there is an overlap between the user's information and information contained within a knowledge base;
   ranking one or more matches of the user by analyzing a distance between locations of the one or more matches and the user, mining an availability based on one or more scheduling applications, evaluating user feedback from previous matches and/or predefined user preferences, wherein a position of hierarchy within the ranking is dynamically assigned based on a ranking function which prioritizes the distance and the availability of the user and the one or more matches, wherein the distance is specified as a fine grained distance and is determined using an enterprise directory and at least one enterprise messaging tool to localize, in real time, a physical position of the user;
   displaying the ranked one or more matches and information corresponding to the one or more matches to the user, including mined data from the enterprise directory, wherein the mined data includes a company photo, a mobile phone number, and a current room location; and
   collecting feedback from the user utilizing one or more prompts displayed in a user interface, wherein each of the one or more prompts corresponds to one of a plurality of dimensions.

8. The computer system of claim 7, wherein collecting the user's information further comprises:
   determining that the user has ad hoc input; and
   collecting and prioritizing the user's ad hoc input.

9. The computer system of claim 8, wherein the user's ad hoc input is a question that requires a response from another user.

10. The computer system of claim 7, wherein determining that there is the overlap between the user's information and information contained within the knowledge base further comprises:

parsing the user's information and information contained within the knowledge base using a natural language processing (NLP) technique; and sorting the user's parsed information and the parsed information from the knowledge base into one or more categories.

11. The computer system of claim 7, wherein displaying the ranked one or more matches to the user further comprises:

populating the ranked one or more matches in an interactable user interface.

12. The computer system of claim 7, wherein collecting feedback from the user further comprises:

prompting the user, in a user interface, to provide feedback relating to a success of a match.

13. A computer program product for matching one or more users, comprising:

one or more non-transitory computer-readable storage media and program instructions stored on at least one of the one or more tangible storage media, the program instructions executable by a processor to cause the processor to perform a method comprising:

collecting information of a user;

determining that there is an overlap between the user's information and information contained within a knowledge base;

ranking one or more matches of the user by analyzing a distance between locations of the one or more matches and the user, mining an availability based on one or more scheduling applications, evaluating user feedback from previous matches and/or predefined user preferences, wherein a position of hierarchy within the ranking is dynamically assigned based on a ranking function which prioritizes the distance and the availability of the user and the one or more matches, wherein the distance is specified as a fine grained distance and is determined using an enterprise directory and at least one enterprise messaging tool to localize, in real time, a physical position of the user;

displaying the ranked one or more matches and information corresponding to the one or more matches to the user, including mined data from the enterprise directory, wherein the mined data includes a company photo, a mobile phone number, and a current room location; and collecting feedback from the user utilizing one or more prompts displayed in a user interface, wherein each of the one or more prompts corresponds to one of a plurality of dimensions.

14. The computer program product of claim 13, wherein collecting the user's information further comprises:

determining that the user has ad hoc input; and collecting and prioritizing the user's ad hoc input.

15. The computer program product of claim 14, wherein the user's ad hoc input is a question that requires a response from another user.

16. The computer program product of claim 13, wherein determining that there is the overlap between the user's information and information contained within the knowledge base further comprises:

parsing the user's information and information contained within the knowledge base using a natural language processing (NLP) technique; and sorting the user's parsed information and the parsed information from the knowledge base into one or more categories.

17. The computer program product of claim 13, wherein displaying the ranked one or more matches to the user further comprises:

populating the ranked one or more matches in an interactable user interface.

* * * * *